US008175974B2

(12) United States Patent
Takahashi

(10) Patent No.: US 8,175,974 B2
(45) Date of Patent: May 8, 2012

(54) PORTABLE STORAGE DEVICE AND TRANSACTION MACHINE

(75) Inventor: Ryoichi Takahashi, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 451 days.

(21) Appl. No.: 12/417,322

(22) Filed: Apr. 2, 2009

(65) Prior Publication Data

US 2009/0192936 A1 Jul. 30, 2009

Related U.S. Application Data

(60) Division of application No. 11/050,760, filed on Feb. 7, 2005, now abandoned, which is a continuation of application No. PCT/JP03/02123, filed on Feb. 26, 2003.

(51) Int. Cl.
*G06Q 40/00* (2012.01)
*G07D 11/00* (2006.01)
*G07F 19/00* (2006.01)
*G06K 5/00* (2006.01)

(52) U.S. Cl. ............... 705/43; 705/39; 705/41; 235/379; 235/380

(58) Field of Classification Search .................... 705/43, 705/39, 41; 235/379, 380
See application file for complete search history.

(56) References Cited

U.S. PATENT DOCUMENTS

| 3,833,885 | A | * | 9/1974 | Gentile et al. | 235/379 |
| 4,736,094 | A | * | 4/1988 | Yoshida | 705/41 |
| 5,326,960 | A | * | 7/1994 | Tannenbaum | 235/379 |
| 5,546,523 | A | | 8/1996 | Gatto | |
| 5,649,118 | A | * | 7/1997 | Carlisle et al. | 705/41 |
| 5,705,798 | A | * | 1/1998 | Tarbox | 235/379 |
| 6,266,653 | B1 | * | 7/2001 | Shiobara et al. | 705/41 |
| 6,315,195 | B1 | * | 11/2001 | Ramachandran | 235/380 |
| 6,328,208 | B1 | * | 12/2001 | Artino et al. | 235/379 |
| 7,243,838 | B1 | * | 7/2007 | DePietro et al. | 235/379 |
| 7,379,896 | B1 | * | 5/2008 | Meek et al. | 705/16 |
| 7,657,473 | B1 | * | 2/2010 | Meffie et al. | 705/35 |
| 7,660,767 | B1 | * | 2/2010 | Schultz et al. | 705/43 |

(Continued)

FOREIGN PATENT DOCUMENTS

EP 0 717 381 6/1996

(Continued)

OTHER PUBLICATIONS

U.S. Office Action (Restriction) mailed Apr. 3, 2008 in parent U.S. Appl. No. 11/050,760 (7 pages).

(Continued)

*Primary Examiner* — Gregory Johnson
(74) *Attorney, Agent, or Firm* — Staas & Halsey LLP

(57) ABSTRACT

In systems which execute transactions with an ATM using an IC card in which plural account information is registered in advance, one or more transaction information and intended use information indicating the intended uses of transactions to be executed by the ATM based on the transaction information are associated with each other and are registered as transaction data in the storage section of the IC card, so as to certainly prevent transactions or selections of accounts which are not intended by the user from being erroneously executed. Prior to the execution of transactions by the ATM, the transaction data is read out for the ATM and the intended use information included in the transaction data are displayed along with said transaction information included in the transaction data, in a transaction selection screen on the ATM.

10 Claims, 9 Drawing Sheets

U.S. PATENT DOCUMENTS

| | | | |
|---|---|---|---|
| 2001/0000535 A1* | 4/2001 | Lapsley et al. | 705/64 |
| 2001/0014881 A1* | 8/2001 | Drummond et al. | 705/43 |
| 2001/0051923 A1* | 12/2001 | Kosuda | 705/43 |
| 2002/0123948 A1* | 9/2002 | Yumoto | 705/35 |
| 2002/0129257 A1* | 9/2002 | Parmelee et al. | 713/180 |
| 2003/0046234 A1* | 3/2003 | Takadachi | 705/43 |
| 2003/0209599 A1* | 11/2003 | Gatto | 235/379 |
| 2004/0004116 A1* | 1/2004 | Hatanaka et al. | 235/379 |
| 2004/0026499 A1* | 2/2004 | Fujioka | 235/379 |
| 2004/0039701 A1* | 2/2004 | Nakamura et al. | 705/42 |
| 2006/0208060 A1* | 9/2006 | Mendelovich et al. | 235/379 |

FOREIGN PATENT DOCUMENTS

| | | |
|---|---|---|
| EP | 1 182 627 | 2/2002 |
| JP | 60-214077 | 10/1985 |
| JP | 5-242132 | 9/1993 |
| JP | 7-28918 | 1/1995 |
| JP | 9-319927 | 12/1997 |
| JP | 11-120264 | 4/1999 |
| JP | 2000-20818 | 1/2000 |

OTHER PUBLICATIONS

U.S. Office Action mailed Jun. 24, 2008 in parent U.S. Appl. No. 11/050,760 (9 pages).

U.S. Office Action mailed Jan. 6, 2009 in parent U.S. Appl. No. 11/050,760 (8 pages).

* cited by examiner

FIG. 2

| BANK NUMBER | BRANCH-OFFICE NUMBER | ACCOUNT NUMBER | ... | THE NAME OF BANK | THE NAME OF BRANCH OFFICE | INTENDED USE | TRANSACTABLE ITEM (1: VALID, 0: INVALID) | | | |
|---|---|---|---|---|---|---|---|---|---|---|
| | | | | | | | PAY | DEPOSIT | BALANCE INQUIRY | ... |
| 1234 | 0001 | 11111111 | ... | A BANK | A BRANCH OFFICE | SALARY ACCOUNT | 1 | 1 | 1 | ... |
| 1234 | 0002 | 22222222 | ... | A BANK | B BRANCH OFFICE | TRAVEL-EXPENSES ACCOUNT | 1 | 1 | 1 | ... |
| 4444 | 0003 | 12345567 | ... | B BANK | A BRANCH OFFICE | RENT WITHDRAWAL | 0 | 1 | 1 | 0... |
| 4444 | 0004 | 98776543 | ... | B BANK | B BRANCH OFFICE | PUBLIC-UTILITY-CHARGES WITHDRAWAL | 0 | 1 | 1 | 0... |
| 5555 | 0005 | 11222334 | ... | C BANK | A BRANCH OFFICE | SENDING MONEY | 0 | 1 | 1 | 0... |

FIG. 4

| CAN I HELP YOU? | | |
|---|---|---|
| PAY | DEPOSIT | UPDATE OF PASSBOOK |
| BALANCE INQUIRY | PAY BY TRANSFER | TRANSFER |

FIG. 5

| THE NAME OF BANK/BRANCH OFFICE | ACCOUNT NUMBER | INTENDED USE |
|---|---|---|
| A BANK A BRANCH OFFICE | 1111111 | SALARY ACCOUNT |
| A BANK B BRANCH OFFICE | 2222222 | TRAVEL-EXPENSES ACCOUNT |

ACCOUNTS FOR WHICH TRANSACTIONS ARE RESTRICTED

| B BANK A BRANCH OFFICE | 1234567 | RENT WITHDRAWAL |
|---|---|---|
| B BANK B BRANCH OFFICE | 9876543 | PUBLIC-UTILITY-CHARGES WITHDRAWAL |
| C BANK A BRANCH OFFICE | 1122334 | SENDING MONEY |

IF YOU WANT TO RELEASE THE RESTRICTION, PLEASE SELECT "RELEASE RESTRICTION".

| | | RELEASE RESTRICTION |
|---|---|---|

FIG. 6

| THE NAME OF BANK/BRANCH OFFICE | ACCOUNT NUMBER | INTENDED USE |
|---|---|---|
| A BANK A BRANCH OFFICE | 1111111 | SALARY ACCOUNT |
| B BANK A BRANCH OFFICE | 1234567 | RENT WITHDRAWAL |
| B BANK B BRANCH OFFICE | 9876543 | PUBLIC-UTILITY-CHARGES WITHDRAWAL |
| A BANK B BRANCH OFFICE | 2222222 | TRAVEL-EXPENSES ACCOUNT |
| C BANK A BRANCH OFFICE | 1122334 | SENDING MONEY |

FIG. 7

| THE NAME OF BANK/BRANCH OFFICE | ACCOUNT NUMBER | INTENDED USE | TRANSACTABLE ITEM |
|---|---|---|---|
| A BANK A BRANCH OFFICE | 1111111 | SALARY ACCOUNT | PAY/DEPOSIT·· |
| A BANK B BRANCH OFFICE | 2222222 | TRAVEL-EXPENSES ACCOUNT | PAY/DEPOSIT·· |
| B BANK A BRANCH OFFICE | 1234567 | RENT WITHDRAWAL | DEPOSIT/BALANCE INQUIRY |
| B BANK B BRANCH OFFICE | 9876543 | PUBLIC-UTILITY-CHARGES WITHDRAWAL | DEPOSIT/BALANCE INQUIRY |
| C BANK A BRANCH OFFICE | 1122334 | SENDING MONEY | DEPOSIT/BALANCE INQUIRY |

IF YOU WANT TO RELEASE THE RESTRICTION, PLEASE SELECT "RELEASE RESTRICTION".

[RELEASE RESTRICTION]

FIG. 8

PLEASE SELECT A TRANSACTION

| PAY | DEPOSIT | UPDATE OF PASSBOOK |
|---|---|---|
| BALANCE INQUIRY | PAY BY TRANSFER | TRANSFER |

FIG. 9

PLEASE SELECT A TRANSACTION.

| BALANCE INQUIRY | DEPOSIT |
|---|---|

FIG. 11

| CAN I HELP YOU? |||
|---|---|---|
| PAY | DEPOSIT | UPDATE OF PASSBOOK |
| BALANCE INQUIRY | PAY BY TRANSFER | TRANSFER |
| | | CHANGE SETTING |

FIG. 12

PLEASE SELECT AN ACCOUNT TO BE CHANGED.

| THE NAME OF BANK/BRANCH | ACCOUNT NUMBER | INTENDED USE |
|---|---|---|
| A BANK A BRANCH OFFICE | 1111111 | SALARY ACCOUNT |
| A BANK B BRANCH OFFICE | 2222222 | TRAVEL-EXPENSES |
| B BANK A BRANCH OFFICE | 1234567 | RENT WITHDRAWAL |
| B BANK B BRANCH OFFICE | 9876543 | PUBLIC-UTILITY-CHARGES WITHDRAWAL |
| C BANK A BRANCH OFFICE | 1122334 | SENDING MONEY |

FIG. 13

THE CURRENT TRANSACTABLE ITEMS
"PAY", "DEPOSIT"···

| PAY | DEPOSIT | UPDATE OF PASSBOOK |
|---|---|---|
| BALANCE INQUIRY | PAY BY TRANSFER | TRANSFER |

THE CURRENT INTENDED USE
IF YOU WANT TO CHANGE THE INTENDED USE OF "SALARY ACCOUNT", SELECT "CHANGE USE".

| CHANGE USE | CONFIRMATION |
|---|---|

FIG. 14

```
THE CURRENT INTENDED USE
"SALARY ACCOUNT"

PLEASE SELECT THE CONTENT OF CHANGE

| SALARY ACCOUNT | TRAVEL-EXPENSES ACCOUNT | PUBLIC-UTILITY-CHARGES WITHDRAWAL |
| SENDING MONEY | .... | ..... |

[CHANGE ITEMS]                    [CONFIRMATION]
```

FIG. 15

```
THE TRANSACTABLE ITEMS AFTER CHANGING ARE AS
FOLLOWS.
"PAY", "DEPOSIT"...
THE INTENDED USE AFTER CHANGING IS AS FOLLOWS.
"SALARY ACCOUNT"

IF YOU ACCEPT THIS, PLEASE PUSH "CONFIRMATION"
IF YOU WANT TO CHANGE, PLEASE PUSH "CORRECTION"

[CORRECTION]                      [CONFIRMATION]
```

FIG. 16

```
IF YOU WANT TO CONTINUE THE PROCESS,
PLEASE PUSH "CONTINUE".

IF YOU WANT TO END THE PROCESS,
PLEASE PUSH "CONFIRMATION".

[CONTINUE]                        [CONFIRMATION]
```

PORTABLE STORAGE DEVICE AND TRANSACTION MACHINE

CROSS REFERENCE TO RELATED APPLICATIONS

This application is a divisional application of application Ser. No. 11/050,760 filed Feb. 7, 2005, now abandoned that is a continuation application, filed under 35 USC 111(a), of International Application PCT/JP2003/002123, filed Feb. 26, 2003.

TECHNICAL FIELD

The present invention relates to a portable storage device such as an IC card in which transaction data such as account numbers is registered beforehand and to a transaction machine such as an ATM (Automated Teller Machine) which executes predetermined transactions (for example, deposition, payment, balance inquiry, payment by transfer, transfer, etc.) based on the transaction data registered in such a portable storage device.

BACKGROUND ART

In transaction cards, such as IC (Integrated Circuit) cards or magnetic cards, issued by financial institutions such as banks, information about a plurality of accounts can be registered so as to enable executing financial transactions (deposition, payment, update of passbook, balance inquiry, payment by transfer, transfer, etc.) for the plurality of accounts, as disclosed in, for example, Japanese Patent Laid-Open (Kokai) No. SHO 60-214077 (Patent Literature 1), Japanese Patent Laid-Open (Kokai) No. HEI 7-28918 (Patent Literature 2), Japanese Patent Laid-Open (Kokai) No. 2000-20818 (Patent Literature 3), etc.

When a user executes a transaction with an automated teller machine (ATM) using a transaction card in which information about a plurality of accounts (account information) is registered as described above, the account information about all the accounts (the names of banks, the names of branch offices, the account numbers, etc.) registered in the transaction card is displayed in an account selection screen on the display section in the ATM. Then, by referring to the account selection screen, the user selects an account for which the transaction is to be executed, using the touch panel on the screen and selects a transaction type (hereinafter, sometimes, referred to as an item; deposition, payment, balance inquiry, payment by transfer, transfer, etc.).

In general, when a user utilizes a plurality of accounts, in many cases, the intended uses are determined for definite purposes pertaining to respective accounts. For example, an account is used for payments of salary, an account is used for withdrawal for rent, an account is used for withdrawal for public utility charges, an account is used for withdrawal for credit card payments, and an account is used for sending money.

However, with existing ATMs, even when a plurality of accounts for different intended uses are registered in a transaction card, the names of banks, the names of branch offices and the account numbers are displayed, as previously described, for urging the user to select an account, so that the user can not distinguish the intended uses for the respective accounts and may erroneously select an unintended account, which may cause inconvenience. For example, when the user intends to deposit to an account exclusive for automatic withdrawal, he may erroneously select and deposit to a wrong account, or he may erroneously draw out from an account exclusive for automatic withdrawal, which may lead to shortage in the balance in the account exclusive for automatic withdrawal, thereby causing inconvenience in that withdrawal can not be executed.

The present invention has been made in view of these problems and aims at enabling displaying the intended uses of respective accounts and enabling restricting selections of transaction types for the respective accounts when a transaction is executed using a transaction card (portable storage device) in which a plurality of account information is registered, so as to prevent transactions or selections of accounts which are not intended by the user from being executed.
[Patent Literature 1]
  Japanese Patent Laid-Open (Kokai) No. SHO 60-214077
[Patent Literature 2]
  Japanese Patent Laid-Open (Kokai) No. HEI 7-28918
[Patent Literature 3]
  Japanese Patent Laid-Open (Kokai) No. 2000-20818

DISCLOSURE OF THE INVENTION

In order to attain the aforementioned objects, a portable storage device according to the present invention includes a communicating section for sending or receiving data to or from a transaction machine and a storage section for storing transaction data required for transactions to be executed by this transaction machine, wherein in the storage section, one or more transaction information and intended use information indicating the intended uses of transactions to be executed by the transaction machine based on the transaction information are associated with each other and are registered as the transaction data, the transaction data in the storage section is read out for the transaction machine through the communicating section prior to the execution of transactions by the transaction machine, and the intended use information included in the transaction data are displayed along with the transaction information included in the transaction data, in a transaction selection screen on the transaction machine.

Also, a portable storage device according to the present invention includes a communicating section and a storage section similarly to those described above, wherein in the storage section, account information about one or more accounts and intended use information indicating the intended uses of the respective accounts are associated with each other and registered as the transaction data, the transaction data in the storage section is read out for the transaction machine through the communicating section prior to the execution of transactions by the transaction machine, and the intended use information included in the transaction data are displayed along with the account information included in the transaction data, in an account selection screen, on the transaction machine, for selecting an account for which transactions are to be performed. When in the storage section, for each of the accounts, transaction type information indicating transaction types to be executed for the account is registered as the transaction data, the transaction type information included in the transaction data may be reflected on the account selection screen on the transaction machine or a transaction selection screen for selecting transaction types to be executed by the transaction machine.

On the other hand, a transaction machine according to the present invention performs predetermined transactions based on transaction data registered in a portable storage device and includes a communicating section for sending or receiving data to or from the portable storage device in which one or more transaction information and intended use information indicating the intended uses of the transaction information are associated with each other and registered as the transaction data, a display section for displaying information about the predetermined transactions, an input section for enabling a user to input information required for executing the predetermined transactions while referring to the display section, a display control section which controls the display state of the display section based on the transaction data read out from the portable storage device through the communicating section and information input from the input section, and a transaction executing section which executes the predetermined transactions based on the transaction information included in the transaction data read out from the portable storage device through the communicating section and information input from the input section, wherein the display control section controls the display state of the display section to display, prior to the execution of transactions by the transaction executing section, the intended use information included in the transaction data along with the transaction information included in the transaction data in a transaction selection screen on the display section.

Also, a transaction machine according to the present invention performs predetermined transactions based on transaction data registered in a portable storage device and includes a communicating section for sending or receiving data to or from the portable storage device in which account information about one or more accounts and intended use information indicating the intended uses of the respective accounts are associated with each other and registered as the transaction data, a display section for displaying information about the predetermined transactions, an input section for enabling a user to input information required for executing the predetermined transactions while referring to the display section, a display control section which controls the display state of the display section based on the transaction data read out from the portable storage device through the communicating section and information input from the input section, and a transaction executing section which executes the predetermined transactions based on the account information included in the transaction data read out from the portable storage device through the communicating section and information input from the input section, wherein the display control section controls the display state of the display section to display, prior to the execution of transactions by the transaction executing section, the intended use information included in the transaction data along with the account information included in the transaction data in an account selection screen, on the display section, for selecting an account for which transactions are to be executed.

Further, when in the portable device transaction type information indicating transaction types to be executed for each of the accounts is registered for each of the accounts as the transaction data, the display control section may cause the transaction type information included in the transaction data read out from the portable storage device through the communicating section to be reflected on the account selection screen or a transaction selection screen for selecting transaction types to be executed by the transaction executing section. At this time, the transaction-type information is reflected thereon as the following items (1) to (3).

(1) The transaction-type information for respective accounts is displayed in the account selection screen.

(2) Selection keys for accounts which are associated with the transaction type information including a transaction type selected by the user through the input section are clearly displayed in the account selection screen. At this time, a restriction releasing key for releasing the restriction on the account selection is displayed in the account selection screen and, when the user designates the restriction releasing key through the input section, the selection keys for all the accounts included in the transaction data may be made selectable and displayed in the account selection screen.

(3) Only the selection keys for transaction types designated by the transaction type information for the account designated by the user through the input section are displayed in the transaction selection screen for the account. At this time, a restriction releasing key for releasing the restriction on the selection of transaction types may be displayed and, when the user designates the restriction releasing key through the input section, the selection keys for all the transaction types may be displayed in the transaction type selection screen.

The transaction machine may further include changing means for changing the intended use information read out from the portable storage device and writing means for writing the intended use information changed by the changing means into the portable storage device through the communicating section. In this case, the display control section may cause a setting changing key for commanding changes of the intended use information to be displayed on the display section and, when the user designates the setting changing key through the input section, may cause a setting changing screen to be displayed on the display section, and the user changes the intended use information using the input section, by referring to the setting changing screen.

Also, the transaction machine may further include changing means for changing the transaction type information read out from the portable storage device and writing means for writing the transaction type information changed by the changing means into the portable storage device through the communicating section. In this case, the display control section may cause a setting changing key for commanding changes of the transaction type information to be displayed on the display section and, when the user designates the setting changing key through the input section, may cause a setting changing screen to be displayed on the display section, and the user may change the transaction type information using the input section, by referring to the setting changing screen.

With the aforementioned portable storage device and the transaction machine according to an embodiment of the present invention, the intended use information for respective transactions or respective accounts are registered beforehand in the portable storage device and thus in the transaction machine the intended uses can be displayed on a selection screen on the transaction machine when transactions using the portable storage device are to be executed. Thus, the user can select transactions or accounts while referring to the intended use information. This may certainly prevent transactions or account selections which are not intended by the user from being erroneously executed.

Further, for respective accounts, transaction type information indicating transaction types to be executed for the accounts is registered in the portable storage device, and in the transaction machine the transaction type information can be reflected on the account selection screen and the transaction selection screen to restrict the selection of transaction types for the respective accounts, when transactions using the portable storage device are to be executed. This may certainly prevent transaction types which are not intended by the user from being erroneously selected.

At this time, the transaction type information for the respective accounts are displayed in the account selection screen and thus the user can certainly recognize the transaction types to be executed for the respective accounts. This may certainly prevent the user from erroneously selecting wrong transaction types for the selected account.

Further, the selection keys for accounts associated with transaction type information including transaction types designated by the user may be clearly displayed or only the selection keys for transaction types designated by the transaction type information associated with an account designated by the user may be displayed in the transaction selection screen, which enables easily and certainly restricting on the selection of transaction types for respective accounts.

At this time, a restriction releasing key for releasing the restriction on the selection of accounts or transaction types may be displayed and, when the restriction releasing key is designated, all the selection keys may be selectably displayed. Therefore, even when the selection is restricted in the account selection screen or the transaction selection screen, the restriction on selection can be released as required by the user and the user can freely select transaction types, thereby improving the convenience.

Further, the user can cause a setting change screen to be displayed by using a setting changing key in the transaction machine and can change the intended use information or the transaction type information and write it into the portable storage device, while referring to the setting change screen. Therefore, the user can freely change the contents of the intended use information or the transaction type information (the restriction on selections) and reset them in the portable storage device, thereby improving the convenience.

BRIEF DESCRIPTION OF THE DRAWINGS

FIG. 2 is a view illustrating a concrete example of transaction data registered in an IC card according to the present embodiment.

FIG. 4 is a view illustrating an initial screen (item selection screen) in the first aspect.

FIG. 5 to FIG. 7 are views illustrating account selection screens in the aforementioned first aspect.

FIG. 8 and FIG. 9 are views illustrating item selection screens (transaction selection screens) in the aforementioned first aspect.

FIG. 11 is a view illustrating an initial screen (item selection screen) in the aforementioned second aspect.

FIG. 12 to FIG. 16 are views illustrating setting change screens in the aforementioned second aspect.

BEST MODES FOR CARRYING OUT THE INVENTION

Hereinafter, embodiments of the present invention will be explained with reference to the drawings.

[1] Configuration of the Present Invention

Figure 1:
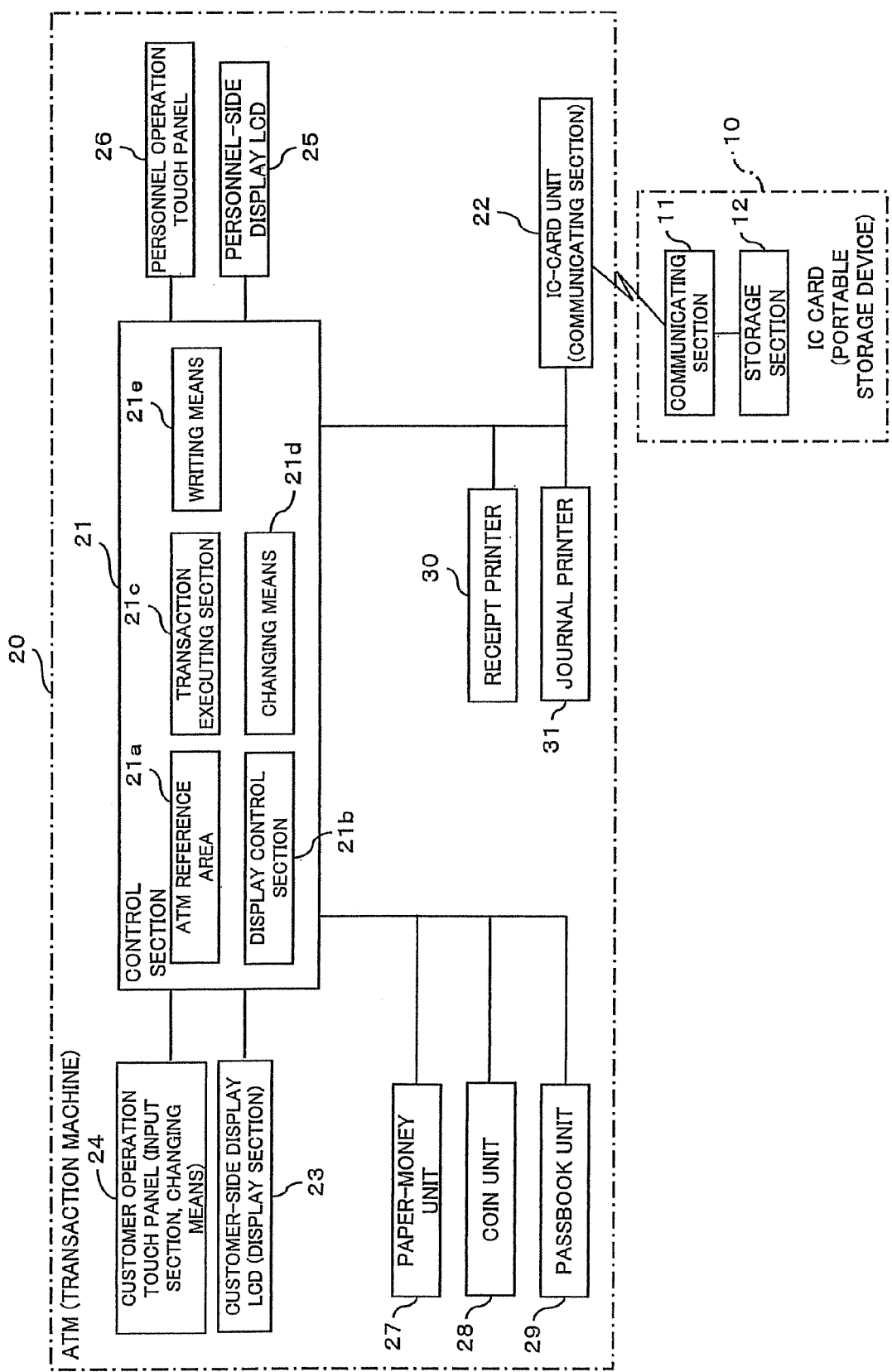
FIG. 1 is a block diagram illustrating the configurations of a portable storage device (IC card) and a transaction machine (ATM) according to an embodiment of the present invention.

FIG. 1 is a block diagram illustrating the configurations of a portable storage device (IC card) and a transaction machine (ATM) according to an embodiment of the present invention, and FIG. 2 is a view illustrating a concrete example of transaction data registered in the IC card according to the present embodiment.

In the transaction system according to the present embodiment, a customer who utilizes transactions (hereinafter, referred to as a user) carries an IC card 10 configured as illustrated in FIG. 1 and ATM corners in financial institutions such as banks are equipped with ATMs 20 configured as illustrated in FIG. 1.

The IC card 10 (transaction card, portable storage device), which is issued by a financial institution such as a bank and carried by the user as previously described, is configured to include a communicating section 11 and a storage section 12. Further, the IC card 10 may be of either contact-type or non-contact-type.

The communicating section 11 is adapted for receiving or sending data from or to the ATM 20 (an IC-card unit 22 which will be described later). In the case where the IC card 10 is of contact-type, the communicating section 11 is configured as a contact terminal provided on the surface of the IC card. In the case where the IC card 10 is of non-contact type, the communicating section 11 is configured as a coil-type antenna embedded in the IC card 10.

The storage section 12 stores transaction data required for transactions to be executed by the ATM 20 (a transaction executing section 21c which will be described later). In this storage section 12, account information about one or more account (bank numbers, branch-office numbers, account numbers, the names of banks, and the names of branch offices), intended-use information indicating the intended uses of the respective accounts (hereinafter, referred to as the purposes of use or the contents of use) and transaction type information indicating transaction types (hereinafter, referred to as transactable items) to be executed for the respective accounts are associated with one another and registered as the aforementioned transaction data.

As will be described later, the transaction data in the storage section 12 is read out to the ATM 20 sides through the communicating section 11 prior to the execution of transactions by the ATM 20. Then, the intended-use information included in the transaction data is displayed, along with the account information included in the transaction data, in an account selection screen for selecting an account for which transactions are to be executed in the ATM 20. Besides, the transaction type information included in the transaction data is reflected on the account selection screen on the ATM 20 or a transaction selection screen (sometimes, referred to as an item selection screen) for selecting items to be executed in the ATM 20.

The aforementioned account information or the purposes of use and the transactable items for the respective accounts are basically applied for by the user at the window of a financial institution and registered, at the window, in the storage section 12 of the IC card 10. Also, the user may register the purposes of use and the transactable items for the respective accounts by operating the ATM 20. In the present embodiment, the user can change the purposes of use and the transactable items for the respective accounts, which are stored in the storage section 12, through the ATM 20 as will be described in a second aspect and a third aspect.

FIG. 2 illustrates a concrete example of the transaction data registered in the IC card 10 according to the present embodiment. The transaction data illustrated in FIG. 2 includes five pieces of information. The first account information relates to an account of A branch office of A bank (an account number of 1111111) and the second account information relates to an account of B branch office of A bank (an account number of 2222222). The third account information relates to an account of A branch office of B bank (an account number of 1234567), the forth account information relates to an account of B branch office of B bank (an account number of 9876543), and the fifth account information relates to an account of A branch office of C bank (an account number of 1122334).

Further, the purposes of use for the respective accounts are set and registered. In the example illustrated in FIG. 2, the purpose of use for the first account is set to "a salary account" (an account to which salary is transferred), the purpose of use for the second account is set to "a travel expenses account", the purpose of use for the third account is set to "rent withdrawal" (an account from which rent is withdrawn), the purpose of use for the forth account is set to "public utility charges withdrawal" (an account from which public utility charges are withdrawn), and the purpose of use for the fifth account is set to "sending money" (an account for sending money), Further, in the example illustrated in FIG. 2, for the respective items (pay, deposit and balance inquiry), "1" is set for valid items while "0" is set for invalid items. Thus, transactable items are set for each account. Namely, items for which "1" is set are transactable items while executions of items for which "0" is set are restricted (transaction-restricted items). More specifically, for the first and second accounts, all of the items are set to transactable items, while for the third to fifth accounts two items, which are deposit and balance inquiry, are set to transactable items and the other items are set to transaction-restricted items.

On the other hand, the automatic machine (automatic deposition payment machine, ATM, transaction machine) 20 executes predetermined transactions based on the transaction data registered in the IC card 10 and is configured to include a control section 21, an IC-card unit 22, a customer-side display LCD 23, a customer operation touch panel 24, a personnel-side display LCD 25, a personnel operation touch panel 26, a paper-money unit 27, a coin unit 28, a passbook unit 29, a receipt printer 30 and a journal printer 31.

The IC-card unit (communicating section) 22 is adapted for receiving and sending data from and to the IC card 10.

The customer-side LCD (Liquid Crystal Display) 23 functions as a display section for displaying various types of information (an initial screen which will be described later, the account selection screen, the item selection screen, etc) to be referred to by the user when he executes predetermined transactions by the ATM 20.

The customer operation touch panel (an input section, a changing means) 24 is provided on the screen of the customer-side display LCD 23 and functions as an input section for enabling the user to push and input information required for executing predetermined transactions while referring to the customer-side display LCD 23. Further, the customer operation touch panel 24 issued by the user for inputting changes when he changes the purposes of use and the transactable items, as will be described later.

The personnel-side display LCD 25 displays various types of information to be referred to by personnel when he performs maintenance of the ATM 20 or replenishes paper money, coins or receipt paper. The personnel operation touch panel 26 is provided on the screen of the personnel-side display LCD 25 and is adapted for enabling personnel to push and input information required for performing the aforementioned maintenance or replenishment while referring to the personnel-side display LCD 25.

The paper-money unit 27 is a unit for paying/receiving paper money and the coin unit 28 is a unit for paying/receiving coins. The passbook unit 29 is a unit for printing passbooks, and the receipt printer 30 is a unit for printing receipts. The journal printer 31 is a unit for printing journals.

The control section 21 controls collectively the overall operation of the ATM 20. Particularly, in order to realize characteristic operations of the present invention, the control section 21 includes an ATM reference area 21a and functions as a display control section 21b, a transaction executing section 21c, a changing means 21d and a writing means 21e.

The ATM reference area 21a is an area into which the transaction data read out from the IC card 10 through the IC-card unit 22 is written and is actually a storage area in a RAM (Random Access Memory).

The display control section 21b controls the display state of the LCD 23 based on the transaction data read out from the IC card 10 through the IC-card unit 22 and information input from the touch panel 24. More specifically, the display control section 21b performs the following display controls (1) to (3).

Figure 18:
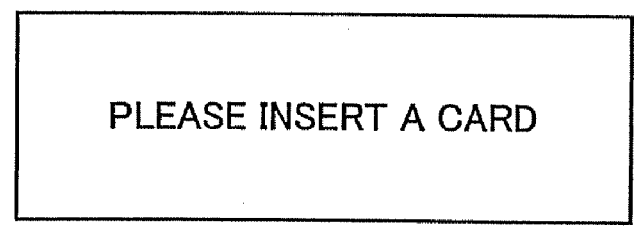
FIG. 18 is a view illustrating an initial screen (card insertion commanding screen) in the aforementioned third aspect.

(1) When waiting for the IC card 10 being inserted, an initial screen is displayed on the LCD 23 of the ATM 20. More specifically, an item selection screen illustrated in FIG. 4 is displayed as the initial screen in the first aspect, which will be described later, and an item selection screen illustrated in FIG. 11 is displayed as the initial screen in the second aspect, which will be described later. A card insertion commanding screen illustrated in FIG. 18 is displayed as the initial screen in the third aspect which will be described later.

(2) After the IC card 10 is inserted, prior to the execution of transactions by the transaction executing section 21c, the purposes of use included in the transaction data in the ATM reference area 21a are displayed along with the account information included in the transaction data, in the account selection screen, on the LCD 23, for selecting an account for which transactions are to be executed (see FIGS. 5 to 7, and FIG. 12).

(3) The transaction type information (transactable items) included in the transaction data in the ATM reference area 21a is reflected on the aforementioned account selection screen or the item selection screen for selecting items to be executed by the transaction execution section 21c (see FIG. 5, FIG. 7 and FIG. 9). The concrete manner of reflecting the transaction type information (transactable items) thereon is as the following items (3-1) to (3-3).

(3-1) The transaction type information (transactable items) for respective accounts is displayed in the account selection screen (see FIG. 7).

(3-2) Selection keys for accounts, which are associated with transaction type information (transactable items) including an item selected by the user through the touch panel 24 are clearly displayed in the account selection screen (see FIG. 5). Further, there is effected a display of a restriction releasing key for releasing the restriction on account selection in the account selection screen (see FIG. 5). When the user designates the restriction releasing key through the touch panel 24, the selection keys for all the accounts included in the transaction data are made selectable and displayed in the account selection screen (see FIG. 6).

(3-3) Only the selection keys for items (transactable items) designated by the transaction type information for the account designated by the user through the touch panel 24 are displayed in the item selection screen (see FIG. 9). Further, a restriction releasing key for releasing the restriction on item selection is displayed (see FIG. 7). When the user designates the restriction releasing key through the input section 24, the selection keys for all the items are displayed in the item selection screen (see FIG. 8).

The transaction executing section 21c executes predetermined transactions based on the account information included in the transaction data in the ATM reference area 21a and information input from the touch panel 24.

Further, the changing means 21d and the writing means 21e function in the second aspect and the third aspect which will be described later. The changing means 21d changes the purposes of use and the transaction type information based on information input through touch panel 24 by the user. Further, the writing means 21e writes the purposes of use or the transaction type information changed by the touch panel 24 and the changing means 21d into the IC card 10 through the IC-card unit 22.

At this time, the display control section 21b causes the LCD 23 to display a setting change key for commanding changes of the purposes of use or the transaction type information (see FIG. 11). When the user designates the setting change key through the touch panel 24, the display control section 21b causes the LCD 23 to display a setting change screen (see FIG. 13 to FIG. 16). The user inputs changes of the purposes of use or the transaction type information using the touch panel 24 by referring to the setting change screen and the changing means 21d changes the purposes of use and the transaction type information in the ATM reference area 21a, based on the input changes.

Here, the control section 21 is constituted by, for example, a CPU (Central Processing Unit), RAMs and ROMs, etc., and the CPU executes predetermined programs to realize the functions of the display control section 21b, the transaction executing section 21c, the changing means 21d and the writing means 21e which have been described above. The aforementioned programs are provided in the form of programs recorded in a computer-readable recording medium such as a flexible disk, a CD-ROM, a CD-R, a CD-RW, a DVD, etc. In this case, the CPU reads out the aforementioned programs from the recording medium, then transfers them to an internal storage device or an external storage device and stores them therein for use. Also, the programs may be recorded in a storage device (recording medium) such as a magnetic disk, an optical disk, and a magnetic optical disk and may be provided from the storage device to the CPU through a communication line.

[2] The Operation of the Present Embodiment

[2-1] First Aspect

Figure 3:
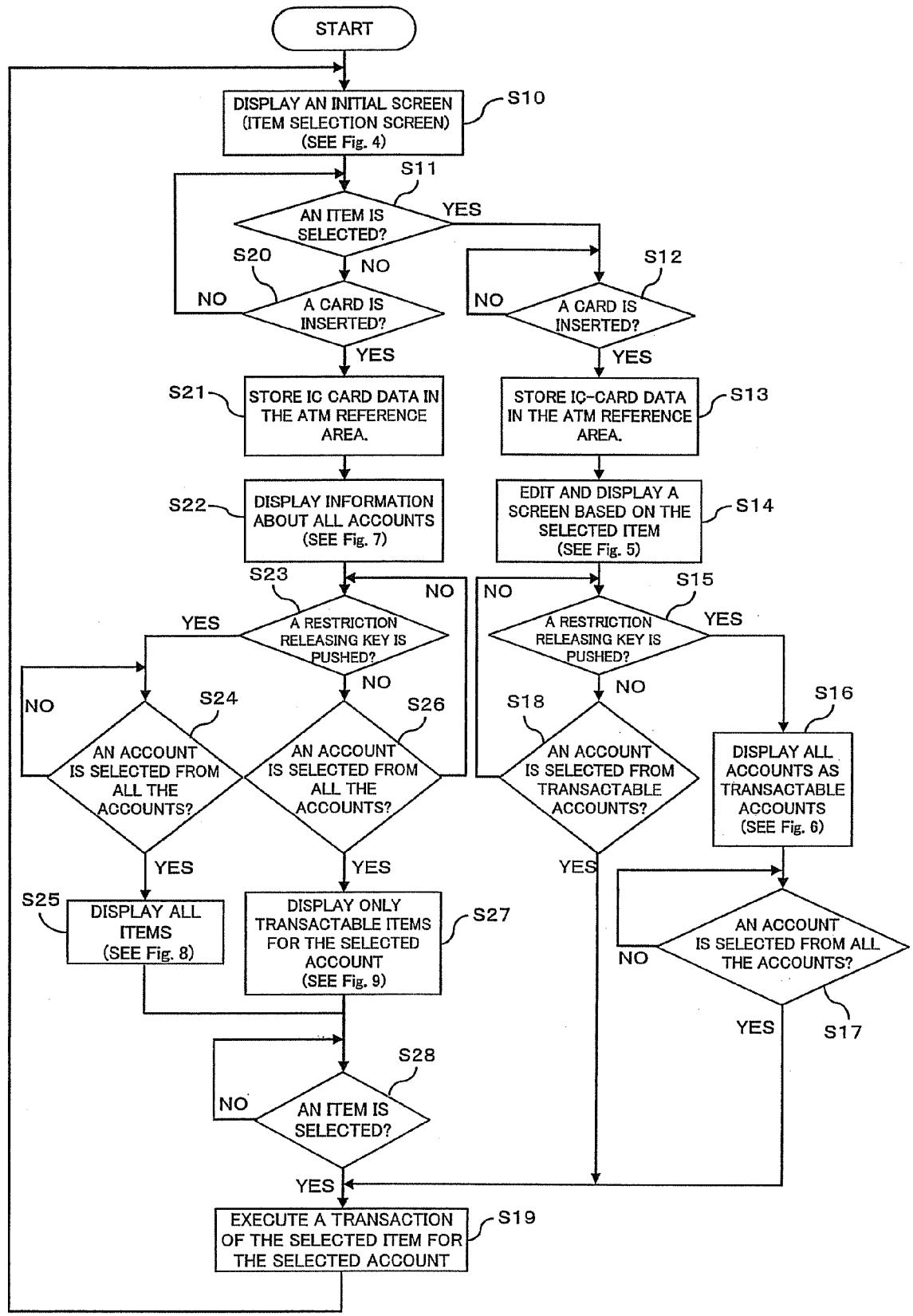
FIG. 3 is a flow chart for explaining a first aspect of the operation of the transaction machine according to the present embodiment.

FIG. 3 is a flow chart for explaining the first aspect of the operation of the ATM (transaction machine) 20 according to the present embodiment. FIG. 4 is a view illustrating an initial screen (item selection screen) according to the first aspect. FIGS. 5 to 7 are views illustrating account selection screens according to the first aspect. FIG. 8 and FIG. 9 are views illustrating item selection screens (transaction selection screens) according to the first aspect.

In the first aspect, with reference to FIG. 4 to FIG. 9, according to the flow chart (steps S10 to S28) illustrated in FIG. 3, there will be described the operation of the ATM 20 (control section 21) in the case where the changing means 21d and the writing means 21e do not function and the user can not change the purposes of use and the transactable items through the ATM 20.

When the insertion of the IC card 10 being awaited, an item selection screen illustrated in FIG. 4 is displayed on the LCD 23 of the ATM 20 as the initial screen (step S10). In the item selection screen illustrated in FIG. 4, there are displayed six selection keys which are pay, deposit, update of passbook, balance inquiry, pay by transfer and transfer are displayed and when the user pushes the display area of each selection key, the item (transaction type) of the pushed area is selected by the function of the touch panel 24.

When a selection key is pushed to select an item at the state where the item selection screen is displayed (the YES route of step S11), the insertion of the IC card 10 is waited (NO route of step S12). When the IC card 10 is inserted (YES route of step S12), the IC-card unit 22 in the ATM 20 sends a data-reading request to the IC card 10 and the transaction data (IC-card data) illustrated in FIG. 2 is read out from the storage section 12 in the IC card 10 and stored in the ATM reference area 21a (step S13).

Then, by referring to the transaction data in the ATM reference area 21a, the display control section 21b edits an account selection screen based on the transaction data and the item selected by the user and causes the LCD 23 to display the account selection screen (step S14). For example, when pay is selected as an item in the state where the transaction data illustrated in FIG. 2 is stored in the ATM reference area 21a, the display control section 21b classifies the accounts into accounts for which pay is set to valid "1" (namely, accounts for which pay is set as a transactable item) and accounts for which pay is set to invalid "0" (namely, accounts for which the transaction of pay is restricted). Then, the display control section 21b edits an account selection screen in which these two types of accounts (account information) are clarified (see, for example, FIG. 5) and causes the LCD 23 to display the account selection screen. Further, in the account selection screen illustrated in FIG. 5, the contents of use for the respective accounts are displayed along with the account information (the names of banks/branch offices and account numbers) and in addition, a restriction releasing key for releasing the aforementioned restriction on transactions (the restriction on selections) is displayed. While in the account selection screen illustrated in FIG. 5 the account information for the transactable accounts and the account information for the accounts for which transactions are restricted are displayed such that they are classified, only the account information for transactable accounts may be displayed and the account information for accounts for which transactions are restricted may not be displayed in the account selection screen.

After the account selection screen as illustrated in FIG. 5 is displayed, when the user designates the restriction releasing key through the touch panel 24, namely when the user pushes the display area of the restriction releasing key (YES route of step S15), the display control section 21b edits an account selection screen in which the selection keys for all the accounts included in the transaction data are selectable (see, for example, FIG. 6) and causes the LCD 23 to display it (step S16). Thus, an account selection screen as illustrated in FIG. 6 is displayed on the LCD 23, instead of the account selection screen as illustrated in FIG. 5. Thus, by referring to the account selection screen as illustrated in FIG. 6 and taking account of the contents of use for the respective accounts, the user selects an account for which the transaction of the selected item (pay in this case) is to be executed, from all the accounts (step S17).

When the user designates the selection key for an account for which the transaction is to be executed, namely when the user pushes the display area of the selection key to select an account for which the transaction is to be executed (YES route of step S17), the transaction executing section 21c starts and executes the transaction of the selected item for the selected account (step S19). The transaction processes from then on is similar to conventional processes and the explanation thereof will be omitted. When this transaction process is terminated, the process returns to step S10.

Also, when the user does not push the restriction releasing key (NO route of step S15) and then selects an account for which the transaction is to be executed from the transactable accounts by referring to the account selection screen as illustrated in FIG. 5 and taking into account the contents of use for the respective transactable accounts (two account in FIG. 5) (YES route of step S18), the transaction executing section 21c starts and executes the transaction of the selected item for the selected account similarly to previously described (step S19). Then, the process returns to step S10.

On the other hand, in the case where the user inserts the IC card 10 into the ATM 20 before selecting an item (in the case where the insertion of the card precedes; NO route of step S11 and YES route of step S20), the IC-card unit 22 in the ATM 20 sends a data-reading request to the IC card 10 and the transaction data (IC-card data) illustrated in FIG. 2 is read out from the storage section 12 in the IC card 10 and stored in the ATM reference area 21a, similarly to the aforementioned step S13 (step S21).

Subsequently, by referring to the transaction data in the ATM reference area 21a, the display control section 21c edits an account selection screen for displaying information about all the accounts included in the transaction data (information including the account information (the names of banks/branch offices and the account numbers), the purposes of use (the contents of use), and the transactable items) (see FIG. 7). Then, the display control section 21a causes the LCD 23 to display the account selection screen (step S22). In the account selection screen, as illustrated in FIG. 7, a restriction releasing key for releasing the restriction on transactions (restriction on selections) is further displayed. In the case where the information about all accounts cannot be displayed in a single screen (account selection screen), a next-screen key is provided and when the user pushes the next-screen key, information, which could not be displayed in a single screen, is displayed in the next screen.

In the state where the account selection screen illustrated in FIG. 7 is displayed, when the user pushes the restriction releasing key (YES route of step S23) and then selects an account for which a transaction is to be executed, from all the accounts in the account selection screen illustrated in FIG. 7, by referring to the purposes of use (the contents of use) (YES route of step S24), the display control section 21b causes the selection keys for all items to be displayed in the item selection screen as illustrated in FIG. 8 (step S25). In the item selection screen illustrated in FIG. 8, similarly to the initial screen, six selection keys, which are pay, deposit, update of passbook, balance inquiry, pay by transfer and transfer, are displayed.

In the state where the account selection screen illustrated in FIG. 7 is displayed, when the user does not push the restriction releasing key (NO route of step S23) and then selects an account for which a transaction is to be executed, from all accounts in the account selection screen illustrated in FIG. 7 by referring to the purposes of use (the contents of uses) and the transactable items (YES route of step S26), the display control section 21b causes only the selection keys for items preset for the selected account to be displayed in the item selection screen, as illustrated in FIG. 9 (step S27). The item selection screen illustrated in FIG. 9 corresponds to the case where the account of A branch office of C bank (the fifth account) is selected in the account selection screen illustrated in FIG. 7. In the item selection screen, only two selection keys for deposit and balance inquiry, which are set as transactable item for the account, are displayed. When the user selects, by referring to the item selection screen displayed at step S25 or step S27, an account from the screen (YES route of step S28), the transaction executing section 21c starts and executes the transaction of the selected item for the selected account, similarly to previously described (step S19). Then, the process returns to step S10.

[2-2] Second Aspect

Figure 10:
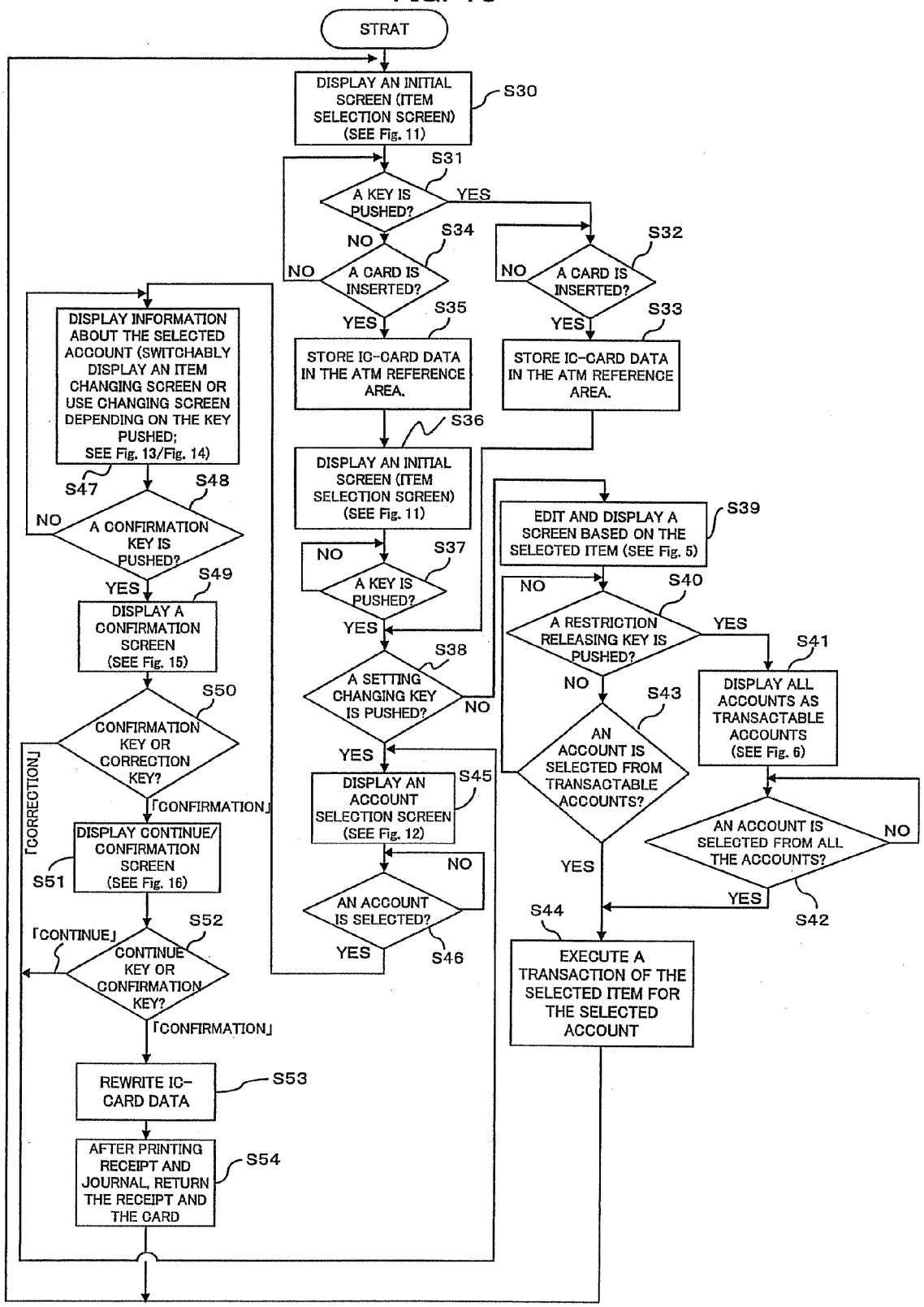
FIG. 10 is a flow chart for explaining the second aspect of the operation of the transaction machine according to the present invention.

FIG. 10 is a flow chart for explaining the second aspect of the operation of the ATM (transaction machine) 20 according to the present embodiment. FIG. 11 is a view illustrating an initial screen (item selection screen) in the second aspect. FIGS. 12 to 16 are views illustrating setting change screens in the second aspect.

In the second aspect, with reference to FIG. 1 to FIG. 16, according to the flow chart (steps S30 to S54) illustrated in FIG. 10, there will be described the operation of the ATM 20 in the case where the changing means 21d and the writing means 21e function and the user can change the purposes of use (the contents of use) and the transactable item through the ATM 20 (control section 21).

When the insertion of the IC card 10 being awaited, the item selection screen illustrated in FIG. 11 is displayed, as an initial image plane, on the LCD 23 of the ATM 20 (step S30). In the item selection screen illustrated in FIG. 11, similarly to the item selection screen in FIG. 4, six selection keys, which are pay, deposit, update of passbook, balance inquiry, pay by transfer and transfer, are displayed and a setting change key for commanding changes of the purposes of use (the contents of use) and the transactable item is further displayed. When the user pushes the display area of each key, the item or the setting changing function of the pushed area is selected by the function of the touch panel 24.

When a key out of the seven keys is pushed in the state where the initial screen is displayed (YES route of step S31), the insertion of the IC card 10 is wait (NO route in step S32). When the IC card 10 is inserted (YES route of step S32), the IC-card unit 22 in the ATM 20 sends a data-reading request to the IC card 10 and the transaction data (IC-card data) illustrated in FIG. 2 is read out from the storage section 12 in the IC card 10 and stored in the ATM reference area 21a (step S33). Then, at step S38, it is determined whether or not the key pushed in the aforementioned initial screen is the setting change key. On the other hand, in the case where the user inserts the IC card 10 into the ATM 20 before selecting and pushing a key in the initial screen (in the case where the insertion of the card precedes; NO route of step S31 and YES route of step S34), the IC-card unit 22 in the ATM 20 sends a data-reading request to the IC card 10 and the transaction data (IC-card data) illustrated in FIG. 2 is read out from the storage section 12 in the IC card 10 and stored in the ATM reference area 21a similarly to the aforementioned step S33 (step S35). At this time, in the second aspect, the initial screen illustrated in FIG. 11 is continuously displayed on the LCD 23 (step S36) and when a key of the seven keys is pushed in the initial screen (YES route of step S37), it is determined whether or not the pushed key is the setting change key (step S38).

When it is determined, at step S38 that the pushed key is an item selection key, not the setting change key (NO route), the processes steps S39 to S44 are executed. Steps S39 to S44 are similar to steps S14 to S19 in FIG. 3 and therefore the explanation thereof will be omitted. When the transaction process at step S44 has ended, the process returns to step S30.

When it is determined, at step S38, that the setting change key has been pushed (YES route), the display control section 21b edits, by referring to the transaction data in the ATM reference area 21a, an account selection screen (setting change screen) for selecting an account for which the setting is to be changed and causes the LCD 23 to display the account selection screen (step S45). In the account selection screen, for example, as illustrated in FIG. 12, the account information (the names of banks/branch offices and the account numbers) and the contents of use for all accounts included in the transaction data in the ATM reference area 21a are displayed.

When the user selects an account for which the setting is to be changed, from among all the accounts in the account selection screen illustrated in FIG. 12, by referring to the purposes of use (the contents of uses) (YES route of step S46), the display control section 21b edits, by referring to the transaction data in the ATM reference area 21a, an item change screen (setting change screen) or a use change screen (setting change screen) including the information about the selected account and causes the LCD 23 to display it (step S47).

Here, in the item change screen, for example, as illustrated in FIG. 13, the current transactable items and the current content of use (the purpose of use) for the selected account are displayed by text and the selection keys for all the items, a use changing key for switching to the use change screen illustrated in FIG. 14 and a confirmation key for confirming changes are displayed. Specifically, in the example illustrated in FIG. 13, "salary account" is set as the content of use and pay and deposit are set as transactable items. In the item change screen, the selection keys set for transactable items are displayed in a different state from the selection keys which are not set for the transactable items. In FIG. 13, the selection keys set for transactable items are hatched. In an actual display screen, for example, the selection keys set for transactable items are displayed in a gray color indicating the pushed state, while the selection keys which are not set for transactable items are displayed in a blue color indicating the un-pushed state. In the item change screen, when any of the selection keys set for transactable items is pushed a single time, the selection key is changed to the state where it is not set for a transactable item, and on the contrary when any of the selection keys which are not set for transactable items is pushed a single time, the selection key is changed to the state where it is set for a transactable item.

Further, in the use change screen, for example, as illustrated in FIG. 14, the current content of use (purpose of use) for the selected account is displayed by text and the selection keys for all contents of use (purposes of uses), an item changing key for switching to the item change screen illustrated in FIG. 13 and a confirmation key for confirming changes are displayed. Specifically, in the example illustrated in FIG. 14, "salary account" is set as the content of use. In the use change screen, the selection keys set for the contents of use and the selection keys which are not set for the contents of use are displayed in different states. In FIG. 14, the selection keys which are currently set for the contents of use are hatched. In an actual display screen, for example, the selection keys which are currently set for the contents of use are displayed in a gray color indicating the pushed state, while the other keys are displayed in a blue color indicating the un-pushed state. In the use change screen, when any of the selection keys set for the contents of use is pushed a single time, the selection key is changed to the state where it is not set for a transactable item, and on the contrary when any of the selection keys which are not set for the contents of use is pushed a single time, the selection key is changed to the state where it is set for the content of use. In the case where only a single item is set as the content of use, when a selection key which is not set for the content of use is pushed a single time, the selection key is switched to the state where it is set for the content of use and concurrently the selection key which has been set for the content of use is switched to a selection key which is not set for the use content.

At a step S47, depending on the use changing key or the item changing key which was pushed, one of the aforementioned item change screen and the use change screen is displayed on the LCD 23 and the content of use or the transactable items for the selected account is changed.

At this time, the transaction data in the form illustrated in FIG. 2 is stored in a work area (not shown; for example, an area in a RAM) and the changing means 21d reverses the validity "1"/invalidity "0" of the transactable items in the transaction data in the work area and changes the contents of use (the purposes of use) in the transaction data in the work area, depending on the aforementioned switching pushing operation.

When the contents of use and the transactable items have been changed and the confirmation key in the item change screen or the use change screen has been pushed (YES route of step S48), the display control section 21b causes the LCD 23 to display a correction/confirmation screen (setting change screen) (step S49). In the correction/confirmation screen, for example, as illustrated in FIG. 15, the content of changes (the transactable items and the contents of use after changing) is displayed by text and a confirmation key which is pushed for correcting the content of changes and a correction key which is pushed for correcting the content of changes are displayed.

When the user pushes the correction key in the correction/confirmation screen ("correction" route of step S50), the process returns to step S45 and the same processes are repeatedly executed. On the other hand, when the user pushes the confirmation key in the correction/confirmation screen ("confirmation" route of step S50), the display control section 21b causes the LCD 23 to display a continue/confirmation screen (setting change screen) (step S51). In the continue/confirmation screen, for example, as illustrated in FIG. 16, a confirmation key which is pushed for terminating the setting changing process and a continue key which is pushed for continuously executing the setting changing process are displayed.

When the user pushes the continue key in the continue/confirmation screen ("continue" route of step S52), the process returns to step S45 and the same processes are repeatedly executed. On the other hand, when the user pushes the confirmation key in the continue/confirmation screen ("confirmation" route of step S52), the writing means 21e causes a data rewriting request to be sent to the IC card 10 from the IC-card unit 22 in the ATM 20 and the transaction data in the storage section 12 in the IC card 10 corresponding to the data rewriting request is rewritten based on the change information in the aforementioned work area (step S53). Subsequently, the content of changes is printed on a receipt and journal by the receipt printer 30 and the journal printer 31, and then the receipt and the IC card 10 are returned to the user (step S54). Then, the process returns to step S10.

[2-3] Third Aspect

Figure 17:
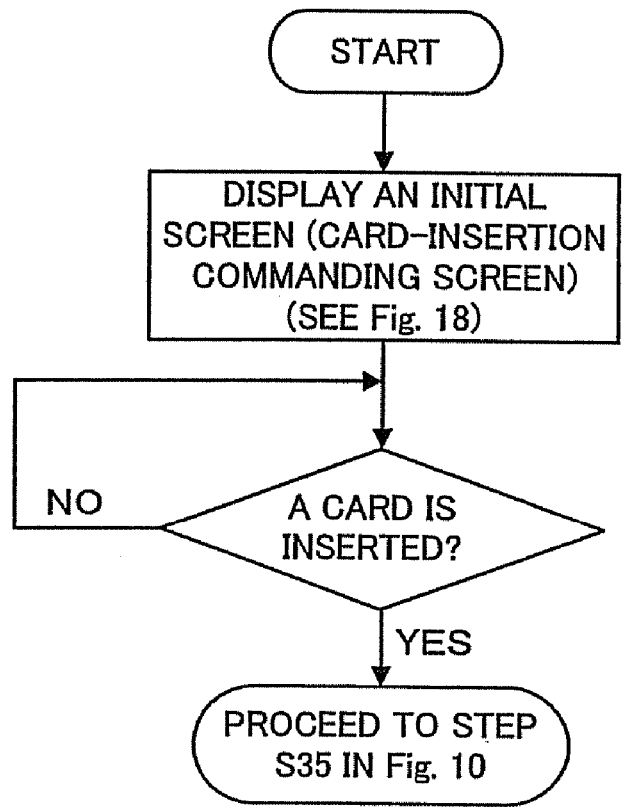
FIG. 17 is a flow chart for explaining a third aspect of the operation of the transaction machine according to the present embodiment.

FIG. 17 is a flow chart for explaining the third aspect of the operation of the ATM 20 according to the present embodiment and FIG. 18 is a view illustrating an initial screen (card insertion commanding screen) according to the third aspect.

In the third aspect, basically, the process is executed with the same procedure as that of the second aspect. However, in the third aspect, as the initial screen, instead of the item selection screen as in the second aspect (see FIG. 1), the card insertion commanding screen as illustrated in FIG. 18 is displayed on the LCD 23 of the ATM 20 (step S60 in FIG. 17). When the user refers to the card insertion commanding screen and inserts the IC card 10 into the ATM 20 (the IC-card unit 22) (YES route of step S61), the process proceeds to step S35 in FIG. 10 and the same processes as those (steps S35 to S54) of the second aspect are executed.

[3] The Effects of the Invention

As described above, with the IC card 10 and the ATM 20 according to an embodiment of the present invention, by registering, beforehand, the purposes of use for respective accounts (respective transactions) in the storage section 12 in the IC card 10, the purposes of use are displayed on the LCD 23 of the ATM 20 along with the account information (the name of bank/branch office and the account number) when transactions using the IC card 10 are to be executed. Thus, the user can recognize the purposes of use of the respective accounts at a glance and can select an account by referring to the purposes of use. This certainly prevents the user from erroneously selecting an unintended account.

Further, by registering, beforehand, transactable items in the storage section 12 of the IC card 10, the information about the transactable items is reflected on the account selection screen and the item selection screen in the ATM 20 to restrict the selection of items for the respective accounts (transaction types), when transactions using the IC card 10 are to be executed. This certainly prevents the user from erroneously selecting items which are not intended by the user.

At this time, the transactable items for the respective accounts are displayed as illustrated in FIG. 7 and thus the user can certainly recognize the transactable items for the respective accounts. This certainly prevents the user from erroneously selecting wrong items for the selected account.

Further, for example, the selection keys for accounts for which an item designated by the user is set as a transactable item may be clearly displayed in the account selection screen as illustrated in FIG. 5 or, for example, only the selection keys for transactable items set for an account designated by the user may be displayed in the transaction selection screen as illustrated in FIG. 9, thereby easily and certainly restricting the selection of items for the respective accounts. At this time, as illustrated in FIG. 5 and FIG. 7, the restriction releasing key can be displayed and, when the restriction releasing key is designated, all the selection keys can be made selectable and displayed (see FIG. 6 and FIG. 8). Therefore, even when the selection is restricted in the account selection screen or the item selection screen, the restriction on selections can be released as required by the user and the user can freely select transaction types, thereby improving the convenience.

Further, the user can cause the setting change screen (see FIG. 12 to FIG. 16) to be displayed using the setting changing key (see FIG. 11) in the ATM 20. Then the user can change the contents of use and the transactable items by referring to the setting change screen and can write them into the storage section 12 in the IC card 10. Therefore, the user can freely change the contents of use and the contents of transactable items (the restriction on selection) and reset them in the IC card 10 as required, thereby improving the convenience.

[4] Others

The present invention is not limited to the aforementioned embodiment and can be implemented by making various modifications thereto without departing from the spirit of the present invention.

For example, while in the aforementioned embodiment there have been described cases where transactions are financial transactions (deposit, pay, update of passbook, balance inquiry, pay by transfer, or transfer) using accounts of financial institutions, the present invention is not limited to this and can be applied to various types of electronic commercial transactions similarly to the aforementioned embodiment to obtain similar effects.

Further, while in the aforementioned embodiment there have been described cases where the portable storage device is an IC card, the present invention is not limited to this and can be applied to any portable device having a storing function such as magnetic cards, optical cards, bio-cards, portable phones, or PDAs (Personal Digital Assistants) to achieve the same effects as those of the aforementioned embodiment.

INDUSTRIAL APPLICABILITY

As described above, with the present invention, by registering intended use information for respective transactions or respective accounts beforehand, the intended use information can be displayed in the selection screen on the transaction machine when transactions are executed using the portable storage device, which can certainly prevent transactions or selections of accounts which are not intended by the user from being executed.

Therefore, the present invention is suitable for systems which execute transactions such as deposition, payment, balance inquiry, payment by transfer or transfer using an IC card in which plural account information is registered in advance and the convenience thereof is extremely high.

The invention claimed is:

1. A transaction machine which performs predetermined transactions based on transaction data registered in a portable storage device, said transaction machine comprising:
   a communicating section for sending or receiving data to or from said portable storage device in which account information about one or more accounts and intended use information indicating the intended uses of the respective accounts are associated with each other and registered as said transaction data;
   a display section for displaying information about said predetermined transactions;
   an input section for enabling a user to input information required for executing said predetermined transactions while referring to said display section;
   a display control section which controls a display state of said display section based on said transaction data read out from said portable storage device through said communicating section and information input from said input section; and
   a transaction executing section which executes said predetermined transactions based on said account information included in said transaction data read out from said portable storage device through said communicating section and information input from said input section;
   wherein said display control section controls the display state of said display section to display, prior to the execution of transactions by said transaction executing section, an account selection screen including said intended use information along with said account information included in said transaction data, on said display section, for selecting an account for which transactions are to be executed,
   wherein in said portable storage device, transaction type information indicating transaction types to be executed for each of said accounts is registered for each of said accounts as said transaction data, and
   said display control section causes said transaction type information registered for the accounts and included in said transaction data read from said portable storage device through said communicating section to be reflected on said account selection screen or on a transaction selection screen for selecting transaction types registered for the accounts to be executed by said transaction executing section.

2. A transaction machine according to claim 1, wherein said display control section controls the display state of said display section to display said transaction type information of the respective accounts in said account selection screen.

3. A transaction machine according to claim 1, wherein said display control section controls the display state of said display section to clearly display, in said account selection screen, selection keys for accounts associated with transaction type information including transaction types designated by said user through input section.

4. A transaction machine according to claim 1, wherein said display control section controls the display state of said display section to display, on said transaction selection screen, only selection keys for transaction types designated by said transaction type information associated with an account designated by said user through said input section.

5. A transaction machine according to claim 3, wherein said display control section controls the display state of said display section such that a releasing key for releasing a restriction on the selection of said accounts is displayed in said account selection screen and, when said user designates said restriction releasing key through said input section, the selection keys for all the accounts included in said transaction data are made selectable and displayed in said account selection screen.

6. A transaction machine according to claim 4, wherein said display control section controls the display state of said display section such that a releasing key for releasing a restriction on the selection of said transaction types is displayed and, when said user designates said restriction releasing key through said input section, the selection keys for all the transaction types are displayed in said transaction selection screen.

7. A transaction machine according to claim 1 further comprising:
changing means for changing said intended use information read out from said portable storage device; and
writing means for writing said intended use information changed by said changing means into said portable storage device through said communicating section.

8. A transaction machine according to claim 7, wherein said display control section causes a setting changing key for commanding changes of said intended use information to be displayed on said display section and, when said user designates said setting changing key through said input section, causes a setting changing screen to be displayed on said display section, and
said user changes said intended use information using said input section, by referring to said setting changing screen.

9. A transaction machine according to claim 1 further comprising:
a changing section for changing said transaction type information read out from said portable storage device; and
a writing section for writing said transaction type information changed by said changing section into said portable storage device through said communicating section.

10. A transaction machine according to claim 9, wherein said display control section causes a setting changing key for commanding changes of said transaction type information to be displayed on said display section and, when said user designates said setting changing key through said input section, causes a setting changing screen to be displayed on said display section, and
said user changes said transaction type information using said input section, by referring to said setting changing screen.

* * * * *